(12) United States Patent
Suzuki et al.

(10) Patent No.: US 7,728,852 B2
(45) Date of Patent: Jun. 1, 2010

(54) IMAGE PROCESSING METHOD AND IMAGE PROCESSING APPARATUS

(75) Inventors: Masahiro Suzuki, Kawasaki (JP); Kenji Morita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 396 days.

(21) Appl. No.: 11/087,499

(22) Filed: Mar. 24, 2005

(65) Prior Publication Data

US 2005/0231532 A1 Oct. 20, 2005

(30) Foreign Application Priority Data

Mar. 31, 2004 (JP) .............................. 2004-106244

(51) Int. Cl.
*G09G 5/00* (2006.01)
(52) U.S. Cl. .................. 345/632; 345/633; 345/629
(58) Field of Classification Search ................ 345/633, 345/629, 630, 632
See application file for complete search history.

(56) References Cited

U.S. PATENT DOCUMENTS

| | | | | |
|---|---|---|---|---|
| 5,394,202 A * | 2/1995 | Deering | .......................... | 353/7 |
| 5,421,589 A * | 6/1995 | Monroe | .......................... | 345/9 |
| 5,913,591 A * | 6/1999 | Melville | ....................... | 353/28 |
| 6,037,914 A * | 3/2000 | Robinson | ....................... | 345/7 |
| 6,045,229 A * | 4/2000 | Tachi et al. | .................... | 353/28 |
| 6,069,633 A * | 5/2000 | Apparao et al. | ............. | 345/421 |
| 6,118,427 A * | 9/2000 | Buxton et al. | ................ | 345/629 |
| 6,166,744 A * | 12/2000 | Jaszlics et al. | .............. | 345/629 |
| 6,278,418 B1 * | 8/2001 | Doi | ............................. | 345/7 |
| 6,537,153 B2 | 3/2003 | Boku et al. | .................... | 463/36 |
| 6,792,370 B2 | 9/2004 | Satoh et al. | .................... | 702/95 |
| 6,853,935 B2 | 2/2005 | Satoh et al. | .................... | 702/94 |
| 6,970,166 B2 | 11/2005 | Kuroki et al. | ............... | 345/428 |
| 2001/0056574 A1 * | 12/2001 | Richards | ....................... | 725/36 |
| 2002/0036617 A1 * | 3/2002 | Pryor | .......................... | 345/156 |
| 2002/0044152 A1 * | 4/2002 | Abbott et al. | ............... | 345/629 |
| 2002/0075286 A1 * | 6/2002 | Yonezawa et al. | ........... | 345/679 |
| 2002/0140709 A1 * | 10/2002 | Sauer et al. | .................. | 345/633 |
| 2003/0032484 A1 * | 2/2003 | Ohshima et al. | .............. | 463/43 |
| 2003/0062675 A1 | 4/2003 | Noro et al. | ................... | 273/237 |
| 2003/0142115 A1 | 7/2003 | Endo et al. | .................. | 345/633 |
| 2003/0185461 A1 | 10/2003 | Ohshima | ..................... | 382/284 |
| 2004/0021664 A1 * | 2/2004 | Takemoto et al. | ........... | 345/419 |
| 2004/0109009 A1 | 6/2004 | Yonezawa et al. | ........... | 345/632 |
| 2005/0116964 A1 | 6/2005 | Kotake et al. | ............... | 345/629 |
| 2005/0179617 A1 | 8/2005 | Matsui et al. | ................... | 345/7 |
| 2005/0203367 A1 * | 9/2005 | Ahmed et al. | ................ | 600/407 |

(Continued)

FOREIGN PATENT DOCUMENTS

JP 04-074282 3/1992

(Continued)

*Primary Examiner*—Michelle K Kay
(74) *Attorney, Agent, or Firm*—Fitzpatrick, Cella, Harper & Scinto

(57) ABSTRACT

A virtual object and stylus model as images to be composited to a real space image are rendered by changing background transparencies according to a mutual positional relationship. When the virtual object image is composited to the real space image, the image of the stylus included in the real space image is observed while reflecting the positional relationship with the virtual object. In this way, in an MR image, the depth ordering between real and virtual objects can be correctly and easily expressed.

4 Claims, 14 Drawing Sheets

U.S. PATENT DOCUMENTS

| | | | |
|---|---|---|---|
| 2005/0212801 A1 | 9/2005 | Kuroki et al. | 345/428 |
| 2005/0215879 A1* | 9/2005 | Chuanggui | 600/407 |

FOREIGN PATENT DOCUMENTS

| | | |
|---|---|---|
| JP | 2000-341721 | 12/2000 |
| JP | 2002-042156 | 2/2002 |
| JP | 2002-157607 | 5/2002 |
| JP | 2002-229730 | 8/2002 |
| JP | 2003-103045 | 4/2003 |
| JP | 2003-269913 | 9/2003 |
| JP | 2003-296759 | 10/2003 |

* cited by examiner

VIDEO BUFFER COMPOSITED IN S2040
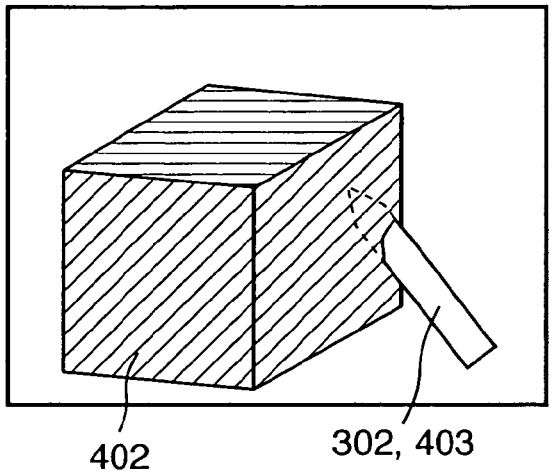
402    302, 403
FIG. 10A
VIDEO BUFFER RENDERED IN S2050 AND S2060
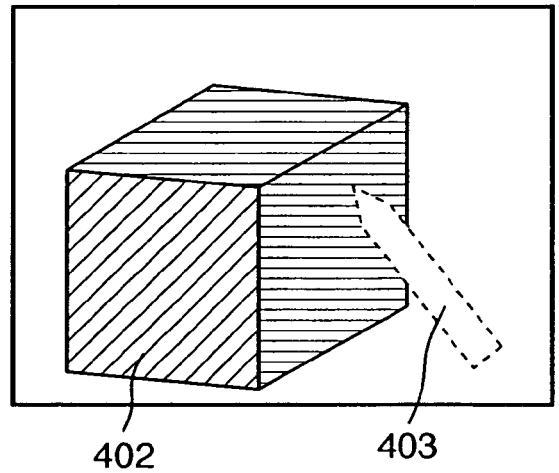
402    403
FIG. 10B
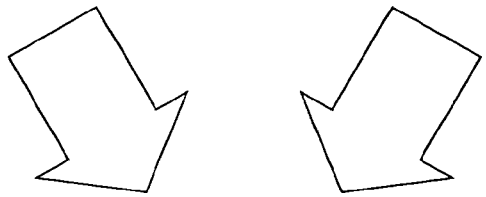
COMPOSITE IMAGE TO BE FINALLY DISPLAYED ON DISPLAY DEVICE 201
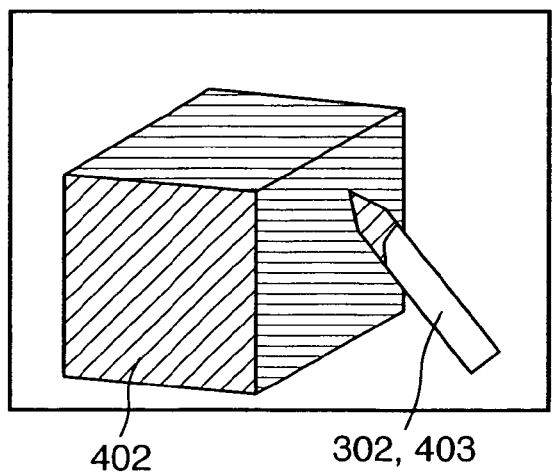
402    302, 403
FIG. 10C

FIG. 11A

```
                    S3030
S3040                 ↓
  ┌───────────────────────────────────────────────────┐
  │              ╱╲  S3041                            │
  │       YES  ╱    ╲  NO                             │
  │      ◄───╱COLLISION?╲───►                         │
  │  S3042   ╲          ╱   S3043                     │
  │           ╲        ╱                              │
  │            ╲      ╱                               │
  │  ┌──────────▼──┐  ┌──▼────────────┐               │
  │  │RENDER VIRTUAL│  │RENDER VIRTUAL │               │
  │  │MODEL AS      │  │MODEL AS       │               │
  │  │TRANSLUCENT   │  │OPAQUE OBJECT, │               │
  │  │OBJECT, AND   │  │AND RENDER     │               │
  │  │NOT RENDER    │  │STYLUS MODEL   │               │
  │  │STYLUS MODEL  │  │AS TRANSPARENT │               │
  │  └──────────────┘  │OBJECT         │               │
  │                    └───────────────┘              │
  │                                         ►  S3050  │
  └───────────────────────────────────────────────────┘
```

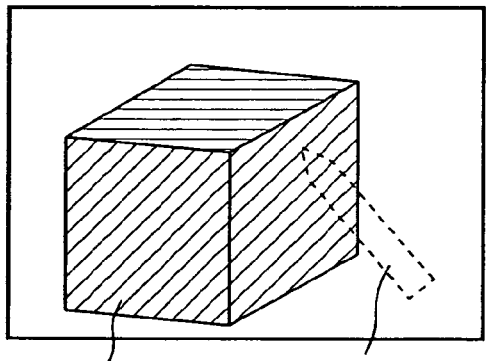

FIG. 11B

HMD VIEW REGION 402  403

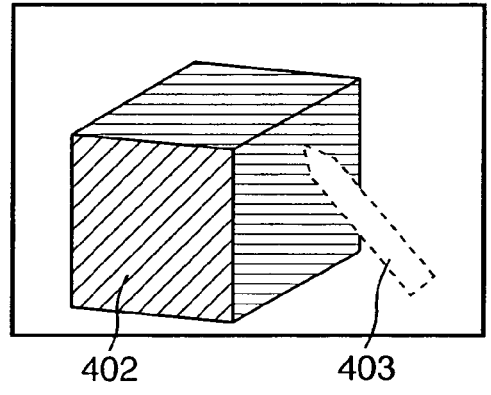

FIG. 11C

HMD VIEW REGION 402  403

OR

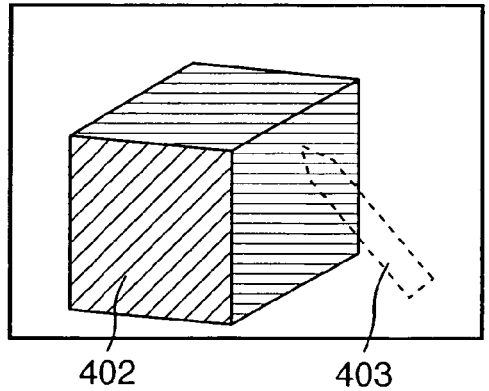

FIG. 11D

HMD VIEW REGION 402  403

F I G. 12A
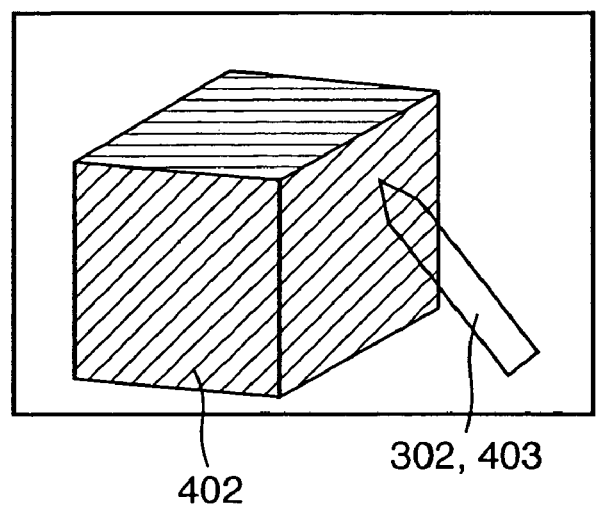
402    302, 403
F I G. 12B
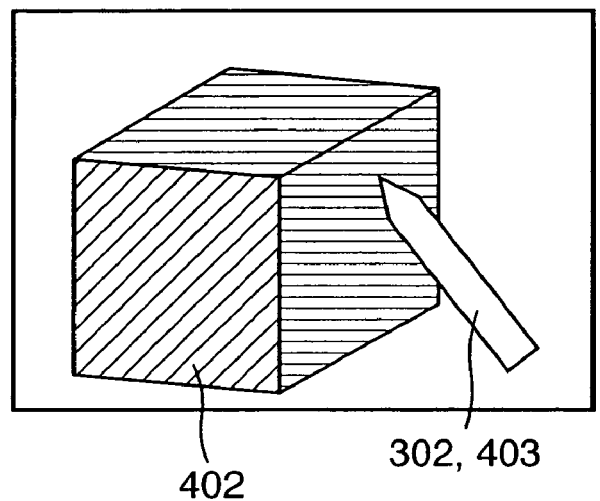
402    302, 403
F I G. 12C
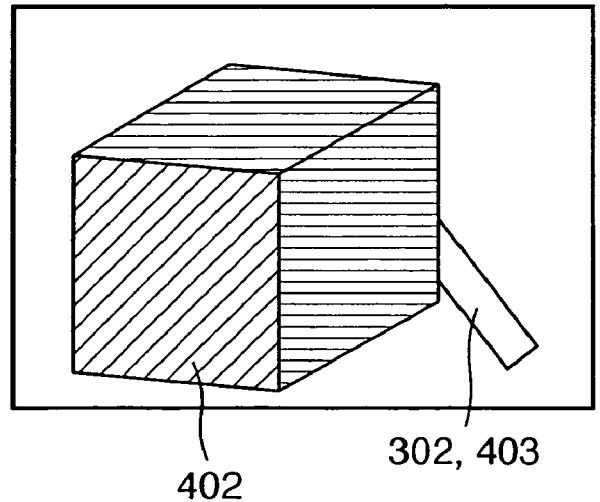
402    302, 403

OR

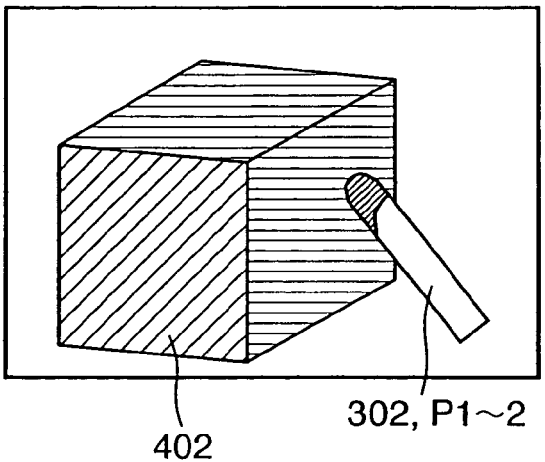
302, P1~2
402
F I G. 14A
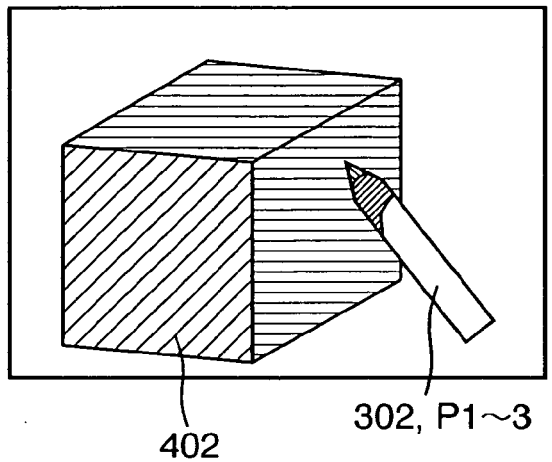
302, P1~3
402
F I G. 14B
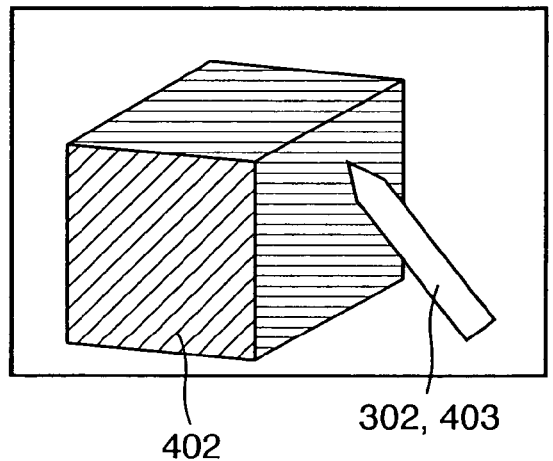
F I G. 14C
302, 403
402
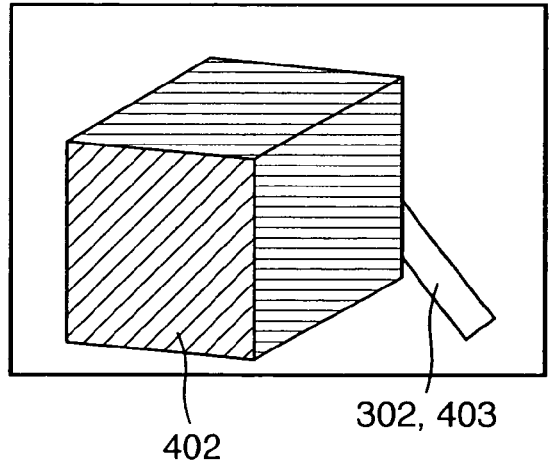
F I G. 14D
302, 403
402

IMAGE PROCESSING METHOD AND IMAGE PROCESSING APPARATUS

CLAIM OF PRIORITY

This application claims priority from Japanese Patent Application No. 2004-106244 filed on Mar. 31, 2004, which is hereby incorporated by reference herein.

FIELD OF THE INVENTION

The present invention relates to an image processing technique for implementing mixed reality and, more particularly, to an image processing technique which can correctly and easily express the depth ordering of a real object and virtual object.

BACKGROUND OF THE INVENTION

Systems that make use of a mixed reality (MR) technique which naturally composites the real and virtual spaces have been extensively proposed. A typical MR system has the following arrangement. That is, an MR image is generated by aligning and compositing a virtual space image rendered by computer graphics (CG) to a real space image sensed by an image sensing device such as a camera or the like. The MR image is displayed on a display device such as a head-mounted display (HMD) that the user (observer/experiencer) wears, thus giving MR to the user.

In the field of virtual reality (VR), a technique that allows the user to manipulate (select, move, and so forth) a virtual object (an object on a virtual space) using a stylus (pen-like shaped pointing tool) as a real object has been prevalently known. The stylus as a real object has a sensor, which can measure the position and orientation of the stylus. Also, the stylus has a switch such as a button or the like. The user turns on/off the button to, e.g., select a virtual object pointed by the stylus.

In a normal MR system, upon generating an MR image, a virtual image that represents the virtual space is superimposed on a real image that represents the real space, and these images are composited. Hence, an image that always includes the virtual object in front of the real object is generated. When the user merely observes the MR image, no problem is posed. However, when the depth must be considered, e.g., when the user manipulates a virtual object by moving the stylus as a real object in his or her hand, a problem is posed.

That is, the stylus which is manually operated by the user often appears in the visual field of the image sensing device that senses the real space. Furthermore, the stylus is present at a depth position within about an accessible range of the user's hand. Therefore, when a virtual object is present outside the accessible range of the user's hand (farther than the stylus when viewed from the user), and the user makes some manipulation on that virtual object using the stylus, the stylus should be displayed in front of the virtual object, i.e., without being occluded by the virtual object. However, when a virtual image is merely composited on a real image, an MR image in which the stylus included in the real image is occluded by the virtual object is generated. The user who observes such MR image in which the depth ordering of the virtual object and real object (stylus) is reversed feels unnatural.

In order to solve such problem, a method of measuring the depth information of the real space including the stylus, and correctly expressing the depth ordering of the real and virtual spaces has been proposed. However, in order to precisely measure the depth information of real space in real time, an expensive apparatus such as a large-scale measuring device, multi-view stereo camera system, and the like must be used. For this reason, such method is often difficult to be adopted in terms of cost, thus calling improvements.

As a depth information acquisition method that can be implemented with relatively low cost, a method of obtaining depth information of the real space by applying an image process to real images sensed by a two-view stereo camera equipped on the HMD worn by the user is known. However, depth information obtained from two-view stereo camera images has low precision and resolution. Hence, such method is difficult to be adopted in an application that attaches importance on accurate expression of the depth ordering.

In order to solve these problems, the present applicant has proposed, in Japanese Patent Laid-Open No. 2003-296759 (US2003/0185461A1), a technique for correctly expressing the depth ordering by registering color information of a real object (object) to be displayed in front of a virtual image, extracting an object region from a real image using this color information, and inhibiting the virtual image from rendering on the object region. However, with this method, the color information required to detect the object region must be manually registered in the system. The manual registration process of the color information requires knowledge and skills, and is not a process that everyone can easily make.

SUMMARY OF THE INVENTION

The present invention has been made in consideration of the aforementioned conventional problems, and has as its principal object to provide an image processing method and apparatus, which can correctly express the depth ordering of real and virtual objects by a simple arrangement.

According to an aspect of the present invention, there is provided an image processing method for generating a mixed reality image by compositing an image of a virtual object having position and orientation information to a real space image, comprising: a user position and orientation information acquisition step of acquiring viewpoint position and orientation information of a user; a real object position and orientation information acquisition step of detecting position and orientation information of a predetermined real object; a positional relationship acquisition step of detecting a positional relationship between the virtual object and a model on the basis of the viewpoint position and orientation information, information of the model of the predetermined real object, the position and orientation information of the real object, and position and orientation information of the virtual object; a rendering step of rendering an image of the virtual object and the model of the predetermined real object using transparencies according to the positional relationship; and a composition step of compositing the real space image and the image generated in the rendering step.

According to another aspect of the present invention, there is provided an image processing apparatus for generating a mixed reality image by compositing an image of a virtual object having position and orientation information to a real space image, comprising: user position and orientation information acquisition unit adapted to acquire viewpoint position and orientation information of a user; real object position and orientation information acquisition unit adapted to detect position and orientation information of a predetermined real object; positional relationship acquisition unit adapted to detect a positional relationship between the virtual object and a model on the basis of the viewpoint position and orientation information, information of the model of the predetermined real object, the position and orientation information of the real object, and position and orientation information of the virtual object; rendering unit adapted to render an image of the virtual object and the model of the predetermined real object using transparencies according to the positional relationship; and composition unit adapted to composite the real space image and the image generated by the rendering unit.

With such arrangement, according to the present invention, the depth ordering of real and virtual objects can be correctly and easily expressed.

Other objects and advantages besides those discussed above shall be apparent to those skilled in the art from the description of a preferred embodiment of the invention which follows. In the description, reference is made to accompanying drawings, which form a part thereof, and which illustrate an example of the various embodiments of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 10A to 10C are views for explaining a composite display image in the second embodiment of the present invention;

FIGS. 11A to 11D are views for explaining a rendering process of a virtual model and stylus model in the third embodiment of the present invention;

FIGS. 12A to 12C are views for explaining a composite display image in the third embodiment of the present invention;

FIGS. 14A to 14D are views for explaining a composite display image in the fourth embodiment of the present invention.

DETAILED DESCRIPTION OF THE PREFERRED EMBODIMENTS

Preferred embodiments of the present invention will now be described in detail in accordance with the accompanying drawings.

First Embodiment

Figure 1:
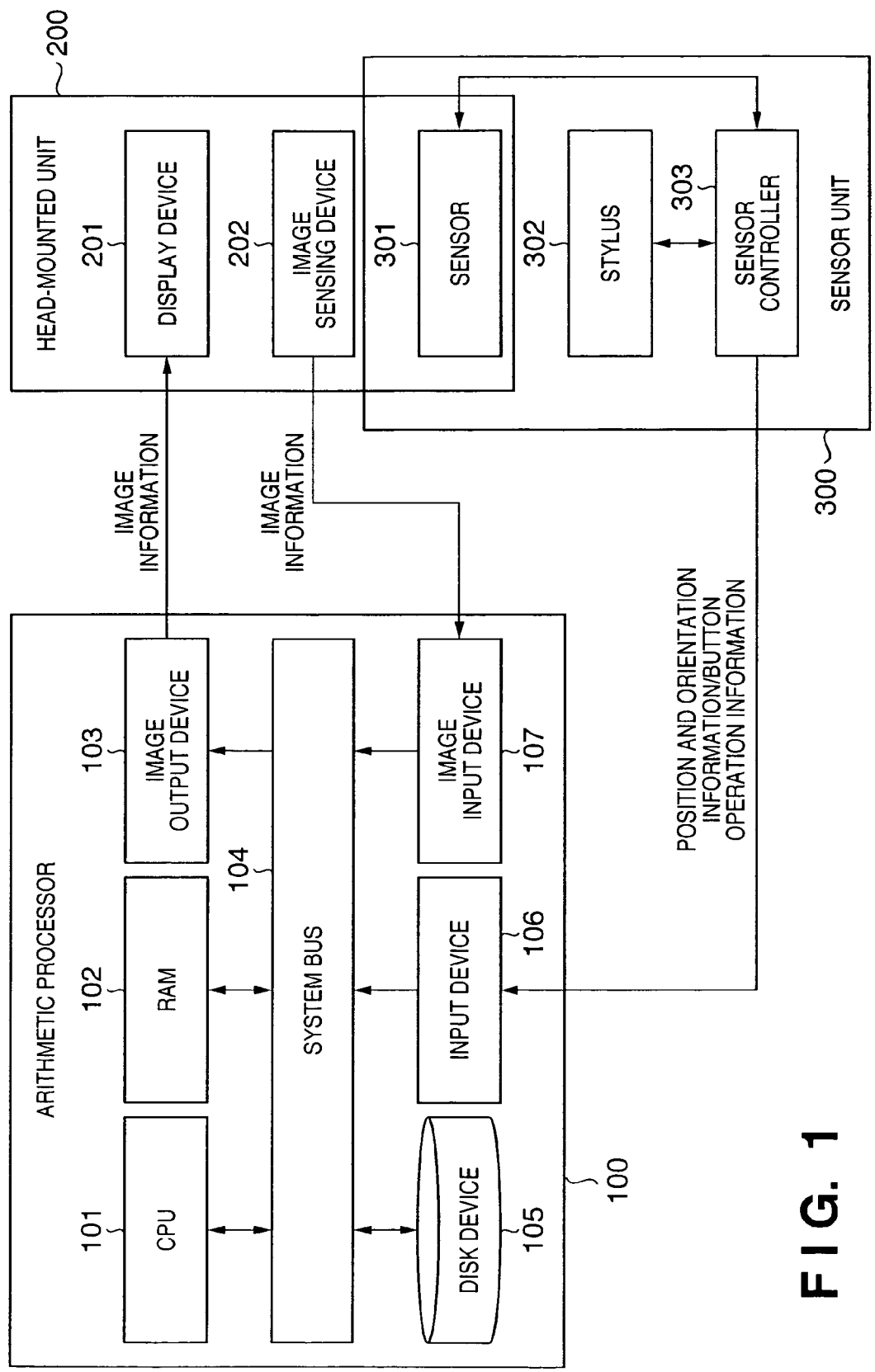
FIG. 1 is a block diagram showing an example of the arrangement of an MR system using an image processing apparatus according to an embodiment of the present invention.

FIG. 1 is a block diagram showing an example of the arrangement of an MR system using an image processing apparatus according to the first embodiment of the present invention.

Referring to FIG. 1, the MR system comprises an arithmetic processor 100 as an image processing apparatus according to this embodiment, a head-mounted unit 200 which is mounted on the head of the user, and a sensor unit 300 used to detect the positions and orientations of a stylus and user's viewpoint.

The arithmetic processor 100 includes, e.g., a computer, which comprises a CPU 101, RAM 102, image output device 103, system bus 104, disk device 105, input device 106, and image input device 107.

The CPU 101 controls respective units of the arithmetic processor 100 by executing an image processing program stored in, e.g., the disk device 105, thus implementing an image process to be described later. The CPU 101 is connected to the system bus 104, and can communicate with the RAM 102, image output device 103, disk device 105, input device 106, and image input device 107 in two ways.

The RAM 102 temporarily stores, via the system bus 104, various data such as virtual space data including layout information of CG models and virtual objects, and the like, sensor measurement values, sensor calibration data, and the like in addition to program codes and program control information of the image processing program, and actually sensed image (real image) data input from the image input device 107. The RAM 102 includes a video buffer (not shown), which stores image data. The virtual space data includes CG models (information of shapes, textures, and the like) such as a virtual object model 402 and stylus model 403, position and orientation information that indicates layout of the virtual object model 402 and stylus model 403 on the virtual space, and the like. The virtual object model 402 and stylus model 403 will be explained later. In this specification, the virtual object model will also be referred to as a virtual object.

The image output device 103 is implemented by a device such as a graphics card or the like. In general, the image output device 103 holds a graphics memory (not shown). Image information generated by a program running on the CPU 101 is written in the graphics memory held by the image output device 103 via the system bus 104. The image output device 103 converts the image information written in the graphics memory into an appropriate image signal, and outputs the converted information to a display device 201. The graphics memory need not always be held by the image output device 103, and the RAM 102 may have the graphics memory function.

The system bus 104 is a communication path which allows the respective units that form the arithmetic processor 100 to communicate with each other.

The disk device 105 is implemented by a hard disk drive or the like. The disk device 105 holds program codes and program control information of the image processing program, virtual space data, sensor calibration data, and the like.

The input device 106 is implemented by various interface devices. That is, the input device 106 receives signals from devices externally connected to the arithmetic processor 100 as data, and writes them on the RAM 102 via the system bus 104. The input device 106 comprises devices such as a keyboard, mouse, and the like, and accepts various operation inputs from the user of this apparatus.

The image input device 107 is implemented by a device such as a capture card or the like. That is, the image input device 107 receives an actually sensed image output from an image sensing device 202 of the head-mounted unit 200, and writes image data on the RAM 102 via the system bus 104. When the display device 201 is of optical see-through type, the image input device 107 may be omitted.

The head-mounted unit 200 is implemented by a video see-through type HMD, which is mounted on the head of the user who experiences MR. The head-mounted unit 200 comprises the display device 201, the image sensing device 202, and a sensor 301. In this embodiment, the user wears on the head a device including the display device 201, image sensing device 202, and sensor 301. However, such device need not be mounted on the user's head as long as the user can experience equivalent MR.

The display device 201 is implemented by a display equipped in a video see-through type HMD. The display device 201 displays an image signal output from the image output device 103, and is used to present an MR image in front of the eyes of the user. The display device 201 is a component that forms the head-mounted unit 200, but need not always be worn by the user. For example, a floor type display device or portable display may be used as the display device 201 as long as the user can confirm an image.

The image sensing device 202 is implemented by one or more image sensing devices such as CCD cameras and the like. The image sensing device 202 is used to sense an actually sensed image of the real space viewed from the user's viewpoint. For this purpose, the image sensing device 202 is preferably mounted at a position near the user's viewpoint position, but its location is not particularly limited as long as it can capture an actually sensed image viewed from the user's viewpoint. The optical axis of the image sensing device 202 may agree with the central axis of the display device 201 using a half mirror, prism, and the like. The actually sensed image sensed by the image sensing device 202 is output to the image input device 107 as an image signal (an analog signal, a digital signal of the IEEE1394 format, or the like). When the display device 201 is of optical see-through type, the image sensing device 202 may be omitted because the user of the apparatus directly observes the real world through the display device 201.

The sensor unit 300 serves as a position/orientation measuring device such as a magnetic sensor or the like which has six degrees of freedom, and is used to measure the positions and orientations of a stylus 302 and the viewpoint (sensor 301) of the user who uses this apparatus. The sensor unit 300 outputs the measured data to the input device 106 of the arithmetic processor 100. The sensor unit 300 includes the sensor 301, the stylus 302, and a sensor controller 303. When a magnetic sensor is used as the sensor unit 300, the sensor controller 303 serves as a transmitter that generates a magnetic field, and the sensor 301 and stylus 302 serve as a receiver that measures the magnetic field.

The sensor 301 measures the position and orientation of the user's viewpoint of this apparatus under the control of the sensor controller 303, and outputs measured data to the sensor controller 303. Strictly speaking, the position where the sensor 301 exists (measures) does not match the user's viewpoint position. However, since the user wears the head-mounted unit 200 on the head, a registration error amount (offset amount) between the position of the sensor 301 and the user's viewpoint position can be considered as a constant amount. Hence, the registration error amount (offset amount) is calculated in advance, and the measured value of the sensor 301 can be corrected by the offset amount. In this specification, for the sake of simplicity of a description and understanding, a description about handling of the registration error amount (offset amount) will be omitted, and the position and orientation measured by the sensor 301 are the same as those of the user's viewpoint. The sensor 301 is a component of both the head-mounted unit 200 mounted on the user's head, and the sensor unit 300.

Figure 2:
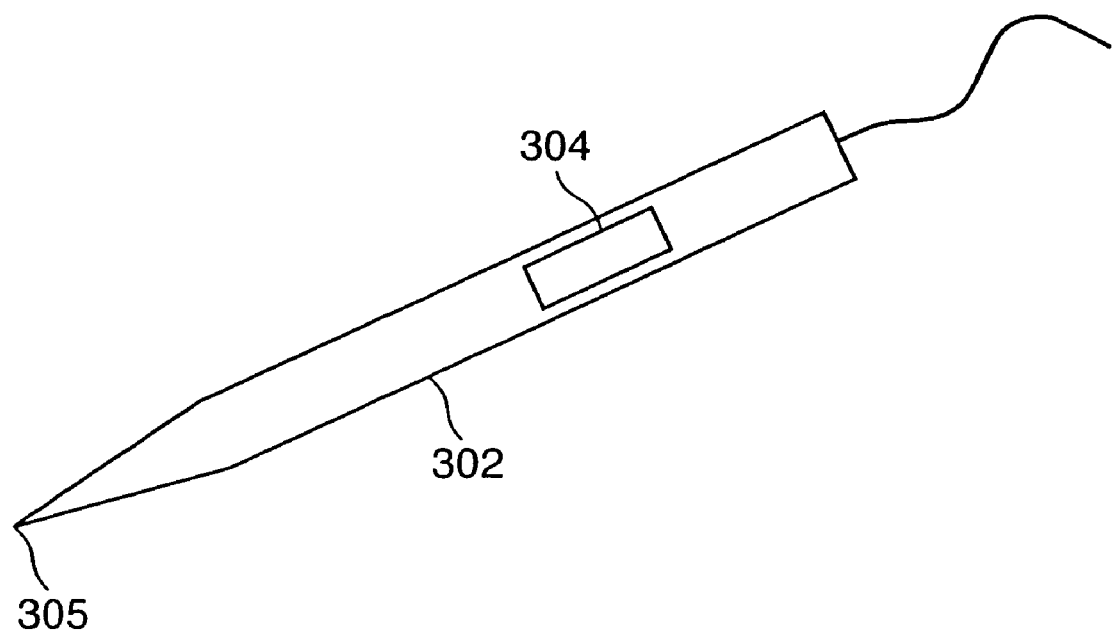
FIG. 2 is a view showing an example of the arrangement of a stylus used in the embodiment of the present invention.

The stylus 302 is a pen-like shaped device, and is used in user's hand. The stylus 302 comprises the same sensor as the sensor 301, which can measure the position and orientation of the stylus 302. FIG. 2 is an outside view showing an example of the shape and arrangement of the stylus 302. The stylus 302 measures the position and orientation of a tip portion 305 under the control of the sensor controller 303, and outputs them to the sensor controller 303. In this specification, the position of the tip portion 305 of the stylus will be referred to as the position of the stylus 302, and a direction of the axis of the stylus (an axis that passes the tip portion 305 and is parallel to the longitudinal direction of the stylus 302) will be referred to as the orientation of the stylus 302 hereinafter. The stylus 302 has at least one push-button switch 304. The ON/OFF state of the push-button switch 304 is sent to the sensor controller 303.

The sensor controller 303 outputs control commands to the sensor 301 and stylus 302, and acquires position and orientation measured values from the sensor 301 and stylus 302 and operation information of the push-button switch 304. The sensor controller 303 outputs the acquired position and orientation measured values of the sensor 301 and stylus 302 to the input device 106 as position and orientation information of the sensor 301 and stylus 302. Also, the sensor controller 303 outputs the acquired operation information of the push-button switch 304 to the input device 106.

Figure 3:
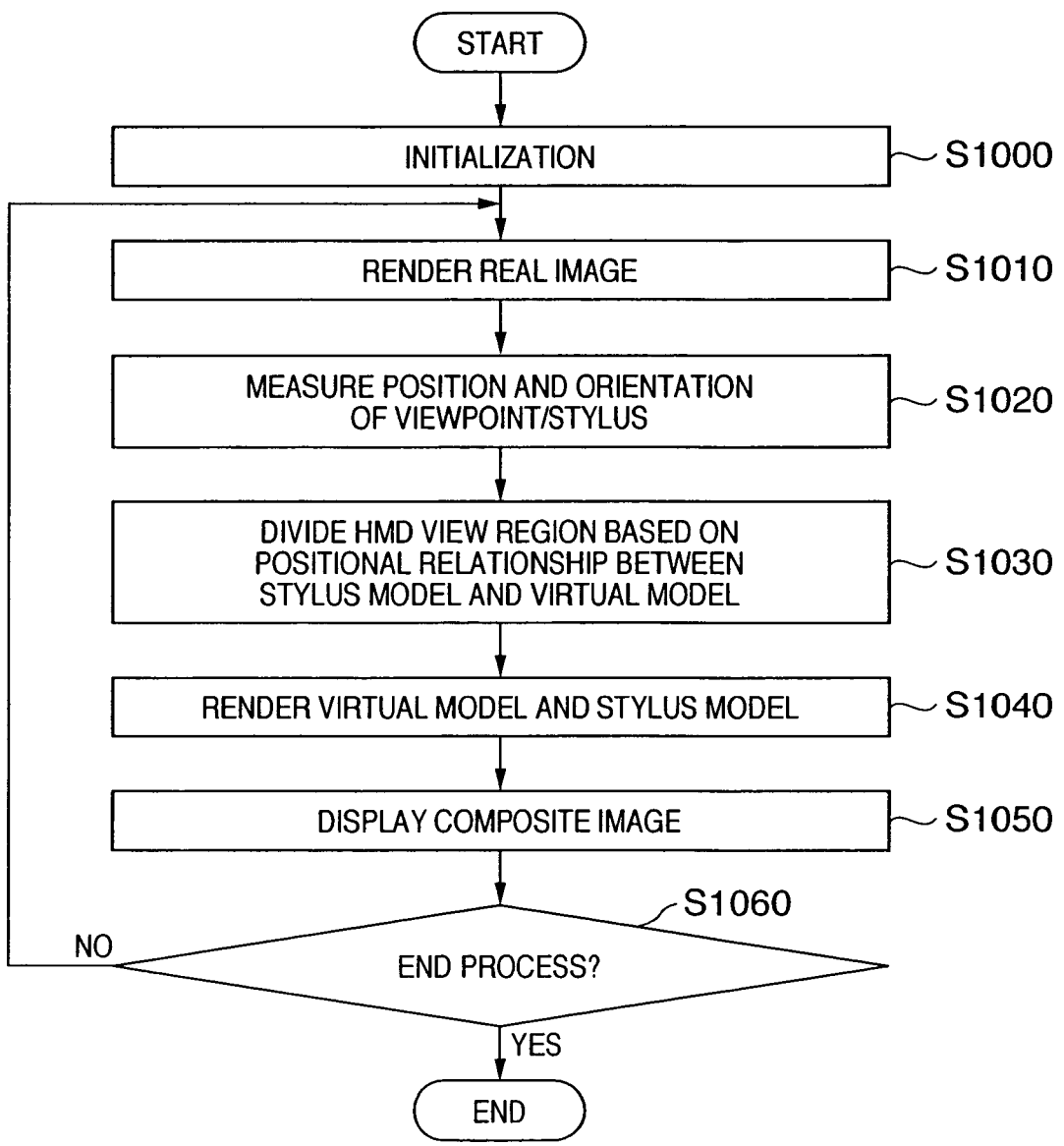
FIG. 3 is a flowchart for explaining an image processing sequence in the first embodiment of the present invention.

The flow of the processing in the system with the above arrangement will be described below using the flowchart shown in FIG. 3. Note that the program codes required to implement the processing shown in FIG. 3 are stored in a storage device such as the disk device 105, RAM 102, or the like, and are read out and executed by the CPU 101.

In step S1000, an initialization process is executed. The initialization includes processes (e.g., to turn on respective devices which form the system, launch a program, and so forth) to be executed first upon advancing the processing sequence of this embodiment.

In step S1010, a real space image sensed by the image sensing device 202 as a component of the head-mounted unit 200 is fetched by the arithmetic processor 100 via the image input device 107. The fetched real space video data is rendered on a memory such as the video buffer or the like.

In step S1020, the position and orientation of the user's viewpoint are measured using the sensor 301 and sensor controller 303 as components of the head-mounted unit 200. Then, the position and orientation of the stylus 302 are measured using the stylus 302 and sensor controller 303. The measured position and orientation information of the user's viewpoint and position and orientation information of the stylus 302 are fetched by the arithmetic processor 100 via the input device 106. The fetched position and orientation information of the user's viewpoint and position and orientation information of the stylus 302 are stored in the disk device 105 or RAM 102.

Next, a process for dividing a view region (HMD view region) corresponding to the image region to be displayed on the display device 201 on the basis of the positional relationship between the virtual object model (virtual object) 402 included in the virtual space data and the stylus 302 is executed. The HMD view region is formed by the video buffer. However, since the stylus 302 is a real object that exists on the real space, the positional relationship with the virtual model 402 that exists on the virtual space cannot be calculated. Hence, in step S1030 the stylus model 403 which expresses a virtual object having the same shape (or a similar shape) as the stylus 302 is prepared in place of the stylus 302. The stylus model 403 is laid out on the virtual space in correspondence with the position and orientation of the stylus 302 measured in step S1020.

In order to lay out the stylus model 403 on the virtual space, the coordinate system of the real space must be perfectly matched with that of the virtual space. This process can be implemented by methods described in, e.g., Japanese Patent Laid-Open Nos. 2002-229730, 2003-269913, and the like. As a result, since the stylus model 403 and virtual model 402 are laid out on the identical virtual space, their positional relationship can be calculated. Then, the view region (HMD view region) corresponding to the image region to be displayed on the display device 201 is divided. More specifically, the division process of the HMD view region is executed based on the positional relationship of images obtained by converting the stylus model 403 and virtual model 402 onto the HMD view region by perspective projection. Regions to be divided are as follows.

Region A: a region where only the virtual model 402 is rendered;

Region B: a region where only the stylus model 403 is rendered or a region where the stylus model 403 and virtual model 402 are rendered, and the surface of the stylus model 403 exists at the front most side when viewed from the user's viewpoint position (i.e., if a so-called Z-buffer value in the CG technique is considered, a region where the smallest Z-buffer value is that by the surface of the stylus model 403);

Region C-1: a region where the stylus model 403 and virtual model 402 are rendered, and one surface of the virtual model 402 exists in front of the surface of the stylus model 403 when viewed from the user's viewpoint position (i.e., if a so-called Z-buffer value in the CG technique is considered, a region where the smallest Z-buffer value is that by the surface of the virtual model 402 and the second smallest Z-buffer value is that by the surface of the stylus model 403);

Region C-2: a region where the stylus model 403 and virtual model 402 are rendered, and two surfaces of the virtual model 402 exist in front of the surface of the stylus model 403 when viewed from the user's viewpoint position (i.e., if a so-called Z-buffer value in the CG technique is considered, a region where the smallest and second smallest Z-buffer values are those by the surfaces of the virtual model 402 and the third smallest Z-buffer value is that by the surface of the stylus model 403);

Region C-n: a region where the stylus model 403 and virtual model 402 are rendered, and n surfaces of the virtual model 402 exist in front of the surface of the stylus model 403 when viewed from the user's viewpoint position (i.e., if a so-called Z-buffer value in the CG technique is considered, a region where the smallest to n-th smallest Z-buffer values are those by the surfaces of the virtual model 402 and the (n+1)-th smallest Z-buffer value is that by the surface of the stylus model 403); and Region D: a region other than regions A to C-n. (Note that a so-called Z-buffer value is used to define the depth information from the viewpoint position for respective pixels in the CG technique, and is stored and managed by the disk device 105 or RAM 102. In general, the Z-buffer value is given infinity as an initial value, and the Z-buffer value of a corresponding pixel is updated to a new value every time a CG model closer to the viewpoint position is rendered. That is, the Z-buffer value is updated to a smaller value.)

Figure 7B:
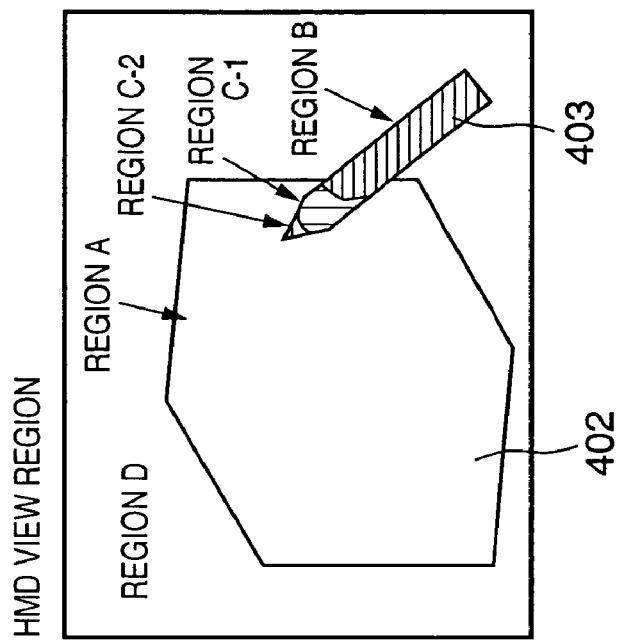
FIGS. 7A and 7B are views for explaining a rendering process of a virtual model and stylus model in the first embodiment of the present invention.
Figure 7A:
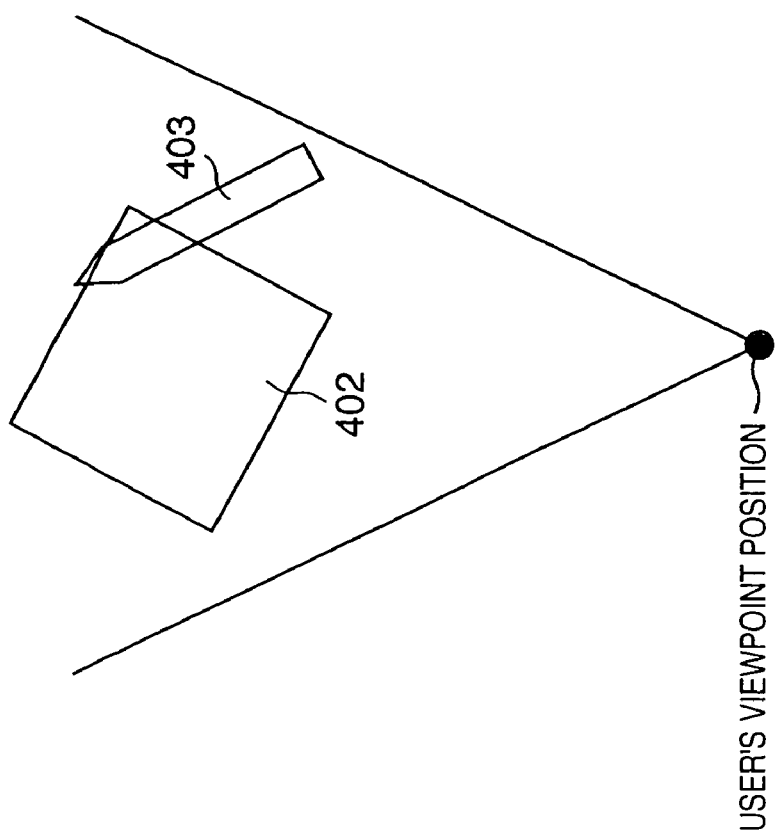

FIGS. 7A and 7B are views for explaining region division made in step S1030, and illustrate a state wherein the virtual model 402 intersects with the stylus model 403 on the virtual space. FIG. 7A shows a state wherein the user observes the virtual model 402 and stylus model 403 laid out on the virtual space when viewed from above the user. Note that FIG. 7A shows only one user's viewpoint position. However, when the head-mounted unit 200 is a stereo type (stereoscopic view type) video see-through HMD, two user's viewpoint positions may be set in correspondence with the right and left eyes. In this case, MR images (disparity images) corresponding to the right and left eyes are generated in accordance with the viewpoint positions to attain a stereoscopic view.

FIG. 7B shows the aforementioned regions A to D obtained by dividing the view region (HMD view region) corresponding to the image region to be displayed on the display device 201. Note that FIG. 7B does not illustrate images to be displayed on the display device 201 and merely shows the video buffer to be stored and managed on the memory. Likewise, the reason why the divided regions (regions A, B, C-1, C-2, and D) are depicted using different patterns in FIG. 7B is not to display the regions using these patterns on the display device 201 but to distinguish the ranges of the respective regions from each other.

In step S1040, the virtual model 402 and stylus model 403 are rendered on a memory such as the video buffer or the like using the region information divided in step S1030, the viewpoint position and orientation information and stylus position and orientation information measured in step S1020, and the position and orientation and color information of the virtual model 402 stored in the disk device 105 or RAM 102. The virtual model 402 and stylus model 403 are rendered as follows to change transparencies as rendering parameters for respective regions on the basis of each region information in FIG. 7B. (Note that since FIG. 7B shows the view region corresponding to the image region to be displayed on the display device 201, it can directly correspond to the buffer on which the virtual model 402 and stylus model 403 are to be rendered.)

Region A: The virtual model 402 is rendered at a background transparency=0%. The background is not seen through at all.

Region B: The stylus model 403 is rendered as a transparent object so as to allow the background (real object) to be seen through the stylus model 403. (That is, the stylus model 403 is rendered using predetermined color buffer values (e.g., (R, G, B)=(0, 0, 0)) to allow a real image as a background image to be seen through while updating Z-buffer values.) As a result, the background (real image) is seen through region B (background transparency=100%).

Region C-1: The virtual model 402 is rendered at a background transparency=(100−α)%. The stylus model 403 is rendered as a transparent model. The background is seen through at the transparency=(100−α)%.

Region C-2: The virtual model 402 is rendered at a background transparency=(100−α×2)%. The stylus model 403 is rendered as a transparent model. The background is seen through at the transparency=(100−α×n)%.

Region C-n: The virtual model 402 is rendered at a background transparency=(100−×n)%. The stylus model 403 is rendered as a transparent model. The background is seen through at the transparency=(100−Δ×n)%.

Region D: No object is rendered. (The background transparency is set to be 100% to allow the background to be seen through.)

where α is a prescribed numerical value indicating the transparency of the virtual model, and the virtual model is rendered by multiplying its color information by α. (for $0 < \alpha \times n \leq 100$)

"Rendering as a transparent object" a given virtual model (virtual model A) does not mean that if another virtual model (virtual model B) exists behind virtual model A viewed from the user, virtual model B is seen through virtual model A. More specifically, even when other virtual models exist, they are not seen through the image region where virtual model A exists, but the real image as the background is seen through that region. This concept is unique to the virtual space that independently handles color buffer values as color information, and Z-buffer values as depth information.

Figure 8:
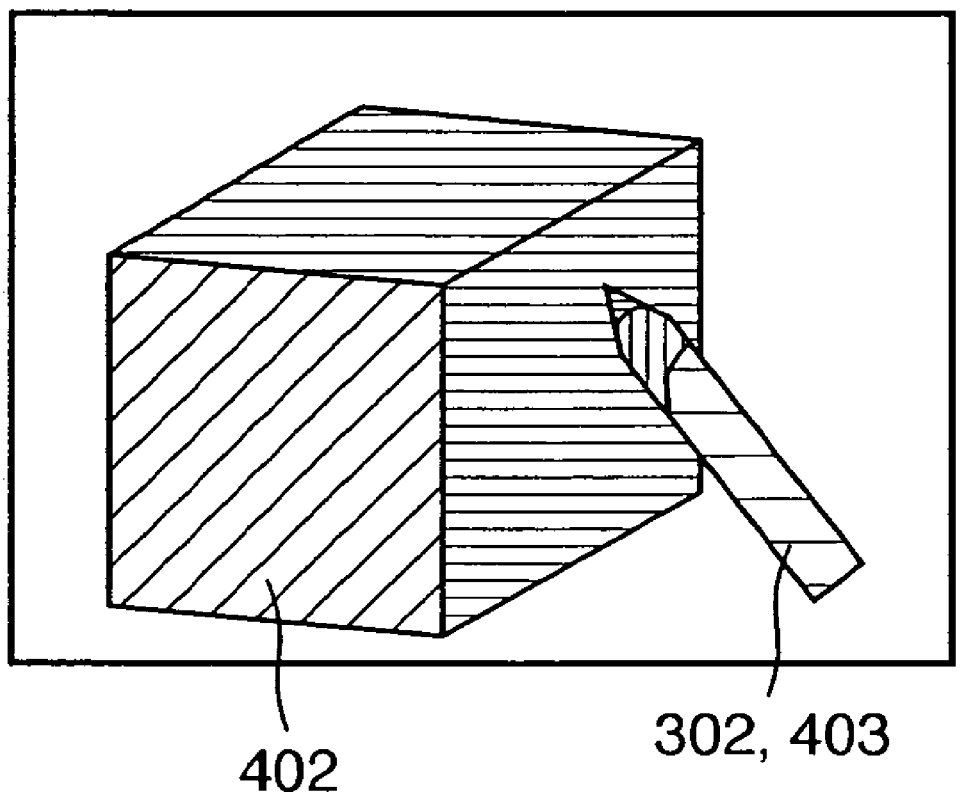
FIG. 8 is a view for explaining a composite display image in the first embodiment of the present invention.

In step S1050, the virtual model 402 and stylus model 403 rendered in step S1040 are superimposed on and composited onto the real image rendered in step S1010, and a composite image is displayed on the display device 201 via the image output device 103. FIG. 8 shows a composited and displayed image. In a region corresponding to region A in FIG. 7B, the real image as the background is not seen through since the background transparency of the virtual model 402 is 0%. In a region corresponding to region B in FIG. 7B, the real image as the background is seen through since the stylus model 403 is rendered as a transparent object. That is, the stylus 302 as the real object which appears in the real image is directly seen without being occluded by the virtual object 402. In a region corresponding to region C-1 in FIG. 7B (a region of the stylus inside the virtual object), the real image as the background is seen through to some extent since the background transparency of the virtual model 402 is (100−α)%. For example, if α=20%, the background transparency of the virtual model 402 is 80%. That is, the stylus 302 as a real object that appears in the real image is seen at the transparency of 80% without being perfectly occluded by the virtual object 402. In a region corresponding to region C-2 in FIG. 7B (a region of the stylus behind the virtual object), the real image as the background is seen through to some extent since the background transparency of the virtual model 402 is (100−α×2)%. For example, if α=20%, the background transparency of the virtual model 402 is 60%. That is, the stylus 302 as a real object that appears in the real image is seen at the transparency of 60% without being perfectly occluded by the virtual object 402. Likewise, in region (C-n), the background transparency of the virtual model 402 is (100−α×n)%.

In this way, the depth ordering, and the intersecting and overlapping states of the virtual object 402 and the stylus 302 as a moving real object can be accurately and easily presented to the user.

If it is determined in step S1060 that the user executes an end process of the apparatus, the apparatus is to end. Ending the apparatus is a process to be finally executed so as to end the processing sequence of this embodiment by quitting the program, turning off the power supplies of devices that form the apparatus, and so forth. If the user does not execute any end process, the flow returns to step S1010.

As described above, according to the first embodiment, the position and orientation of a real object, which may have a state to be displayed without being occluded by a virtual object, are detected, and a model that represents this real object is used. Since a virtual space image is then rendered in accordance with the positional relationship between the virtual object and model determined on the virtual space, an MR image that can precisely express the depth ordering by a simple method and does not make the user feel unnatural can be generated.

Second Embodiment

An MR system using an image processing apparatus according to the second embodiment of the present invention will be described below. Since the MR system according to the second embodiment has the same system arrangement as that explained in the first embodiment using FIGS. 1 and 2, a description thereof will be omitted.

Figure 4:
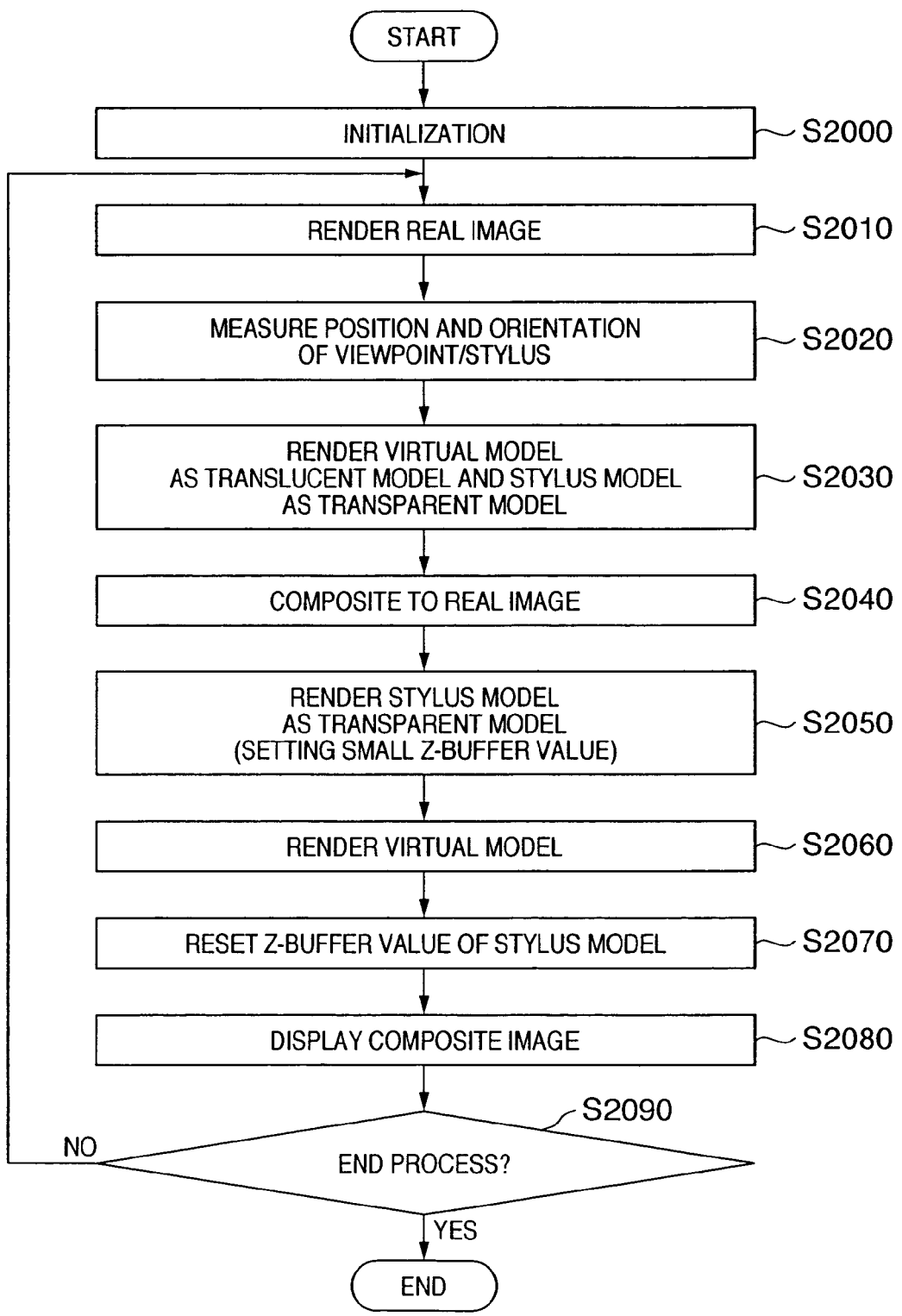
FIG. 4 is a flowchart for explaining an image processing sequence in the second embodiment of the present invention.

FIG. 4 is a flowchart for explaining the overall operation of the MR system according to this embodiment. Note that the program codes required to implement the processing to be described below are stored in a storage device such as the disk device 105, RAM 102, or the like, and are read out and executed by the CPU 101.

Steps S2000 to S2020 are the same as steps S1000 to S1020 in FIG. 3. In step S2000, a process for initializing the apparatus is executed. The initialization includes processes (e.g., to turn on respective devices which form the apparatus, launch a program, and so forth) to be executed first upon advancing the processing sequence of this embodiment.

In step S2010, a real space image sensed by the image sensing device 202 as a component of the head-mounted unit 200 is fetched by the arithmetic processor 100 via the image input device 107. The fetched real space video data is rendered on a memory such as the video buffer or the like.

In step S2020, the position and orientation of the user's viewpoint are measured using the sensor 301 and sensor controller 303 as components of the head-mounted unit 200. Then, the position and orientation of the stylus 302 are measured using the stylus 302 and sensor controller 303. The measured position and orientation information of the user's viewpoint and position and orientation information of the stylus 302 are fetched by the arithmetic processor 100 via the input device 106. The fetched position and orientation information of the user's viewpoint and position and orientation information of the stylus 302 are stored in the disk device 105 or RAM 102.

In step S2030, a virtual stylus model 403 which has the same shape (or a similar shape) as the stylus 302 is prepared. The stylus model 403 is laid out on the virtual space in correspondence with the position and orientation of the stylus 302 measured in step S2020. In order to correctly lay out the stylus model 403 on the virtual space, the coordinate system of the real space must be perfectly matched with that of the virtual space. This process can be implemented by methods described in, e.g., Japanese Patent Laid-Open Nos. 2002-229730, 2003-269913, and the like.

Next, a virtual model 402 (virtual object) is rendered as a translucent object (by changing the transparency as a rendering parameter) and the stylus model 403 is rendered as a transparent object on a memory such as the video buffer or the like using the viewpoint position and orientation information and stylus position and orientation information measured in step S2020, and the position and orientation and color information of the virtual model 402 stored in the disk device 105 or RAM 102. The virtual model 402 is rendered using the color information and translucent information (a so-called α value in the CG technique), which are prepared in advance in the disk device 105 or RAM 102, by multiplying the color information by the a value. The stylus model 403 is rendered using predetermined color buffer values (e.g., (R, G, B)=(0, 0, 0)) to allow a real image as a background image to be seen through while updating Z-buffer values.

Figure 9B:
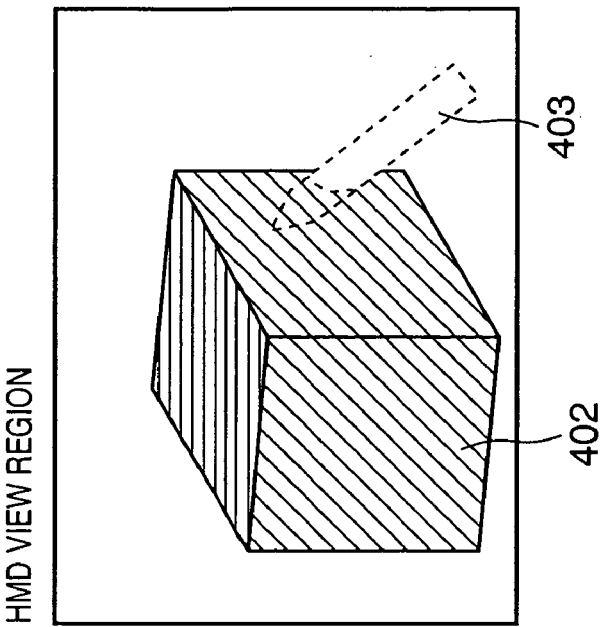
FIGS. 9A and 9B are views for explaining a rendering process of a virtual model and stylus model in the second embodiment of the present invention.
Figure 9A:
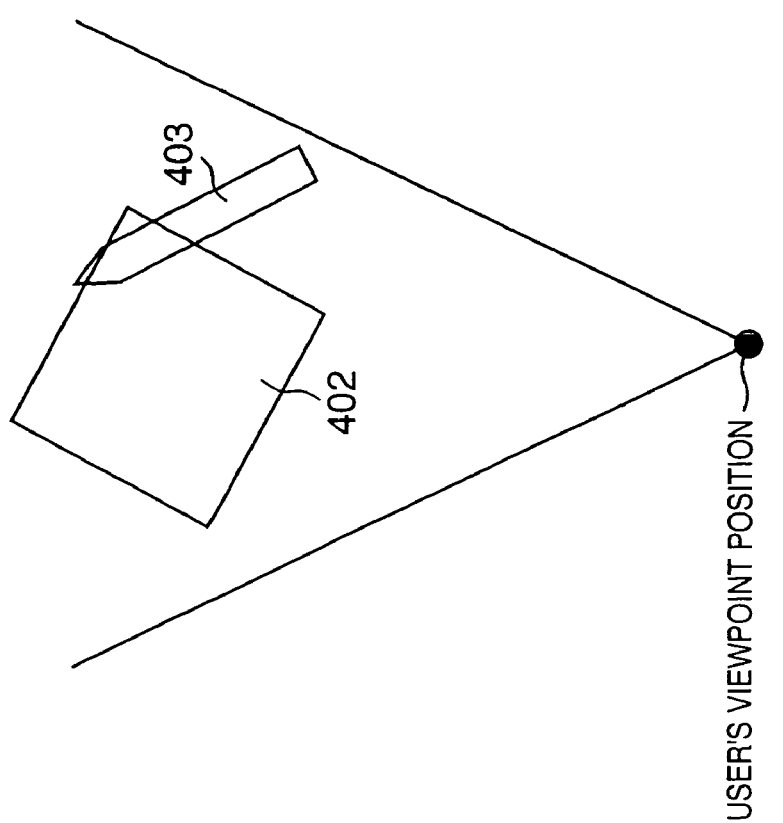

FIGS. 9A and 9B are views for explaining the process in step S2030, and illustrate a state wherein the virtual model 402 intersects with the stylus model 403 on the virtual space. FIG. 9A shows a state wherein the user observes the virtual model 402 and stylus model 403 laid out on the virtual space when viewed from above the user. Note that FIG. 9A shows only one user's viewpoint position. However, when the head-mounted unit 200 is a stereo type (stereoscopic view type) video see-through HMD, two user's viewpoint positions may be set in correspondence with the right and left eyes. In this case, MR images (disparity images) corresponding to the right and left eyes are generated in accordance with the viewpoint positions to attain a stereoscopic view.

FIG. 9B shows a view region (HMD view region) corresponding to the image region to be displayed on the display device 201. (The HMD view region is formed by the video buffer.) In FIG. 9B, the virtual model 402 is rendered as a translucent object, and the stylus model 403 is rendered as a transparent object. That is, the virtual model 402 is rendered in color lighter than original one so as to allow the background to be seen through in a translucent state, and intersection between the virtual model 402 and stylus model 403 is accurately expressed. Note that FIG. 9B indicates the rendering position of the stylus model 403 using the dotted line. However, this dotted line is not rendered on the video buffer in practice. In FIG. 9B, the virtual model 402 is rendered as a translucent model in an overlapping region (the tip portion of the stylus model 403) of the stylus model 403 and virtual model 402.

In step S2040, the virtual model 402 and stylus model 403 rendered in step S2030 are superimposed on and composited onto the real image rendered on the memory such as the video buffer in step S2010 (however, at the timing of step S2040, this composite image is not displayed on the display device 201). In this way, the virtual model 402 and stylus model 403 give away only Z-buffer value information while their color information remains the same, and are handled in the same manner as the background image. (Note that the Z-buffer value is used to define the depth information from the viewpoint position for respective pixels in the so-called CG technique, and is stored and managed by the disk device 105 or RAM 102. In general, the Z-buffer value is given infinity as an initial value, and the Z-buffer value of a corresponding pixel is updated to a new value every time a CG model closer to the viewpoint position is rendered. That is, the Z-buffer value is updated to a smaller value.)

In step S2050, the stylus model 403 is rendered as a transparent object by using the position and orientation information and stylus position and orientation information measured in step S2020 (i.e., using predetermined color buffer values (e.g., (R. G, B)=(0, 0, 0)) to allow a real image as a background image to be seen through while updating Z-buffer values) on a memory such as a video buffer or the like, which is different from the video buffer composited in step S2040. Upon rendering the stylus model 403 in step S2050, the background transparency of a region corresponding to the stylus model 403 is 100%, and the stylus model 403 is preferably rendered to allow the background to be seen through.

More specifically, Z-buffer values are desirably set to be changed to smaller values. That is, the Z-buffer values of the stylus model 403 are changed to locate the stylus model 403 on the front side viewed from the user's viewpoint position so as not to intersect with the virtual model 402.

Therefore, such Z-buffer value adjustment can be implemented by, e.g., making collision checking of the virtual model 402 and stylus model 403, and setting the Z-buffer values of the stylus model 403 in real time so that the virtual model 402 and stylus model 403 do not collide on the virtual space and the stylus model 403 is located on the front side viewed from the user's viewpoint position. As another method, a Z-buffer setting method may be determined in advance within a range that can prevent the stylus model 403 from intersecting with the virtual model 402 (e.g., by setting the Z-buffer values of the stylus model 403 to 1/100).

In step S2060, the virtual model 402 (virtual object) is rendered as a normal opaque object on the video buffer used in step S2050 using the viewpoint position and orientation information measured in step S2020, and the position and orientation and color information of the virtual model 402 stored in the disk device 105 or RAM 102. In step S2050 as an immediately preceding step, since the stylus model 403 is rendered by decreasing its Z-buffer values, the stylus model 403 is rendered on the front side viewed from the user's viewpoint position, and the virtual model 402 is rendered on the back side viewed from the user's viewpoint position. FIG. 10B shows the rendering results of the stylus model 403 and virtual model 402 in steps S2050 and S2060. Note that FIG. 10B plainly indicates the rendering position of the stylus model 403 by illustrating it using the dotted line. However, this dotted line is not rendered on the video buffer in practice. Also, in steps S2050 and S2060, the background transparency is set to be 100% so as to allow the background to be seen through in a region other than the virtual model 402 and stylus model 403.

In step S2070, the Z-buffer values of the stylus model 403, which are set to be small values in step S2050, are returned to original values (reset).

In step S2080, the virtual model 402 and stylus model 403 rendered in steps S2050 and S2060 are superimposed on and composited onto the video buffer composited in step S2040, and a composite image is displayed on the display device 201 via the image output device 103.

FIGS. 10A to 10C are views for explaining an image composited and displayed in step S2080. FIG. 10A shows the video buffer composited in step S2040 (i.e., an image obtained by compositing the real image rendered in step S2010, and the virtual model 402 and stylus model 403 rendered in step S2030), and illustrates a state wherein the translucent virtual model 402 and the stylus 302 as a real object that appears in the real image intersect with each other. FIG. 10B shows the virtual model 402 and stylus model 403 rendered in steps S2050 and S2060, as described above. FIGS. 10A and 10B plainly indicate the rendering position of the stylus model 403 by illustrating it using the dotted line. However, this dotted line is not rendered on the video buffer in practice.

FIG. 10C shows an image obtained by superimposing and compositing FIG. 10B onto FIG. 10A, i.e., an image to be finally displayed on the display device 201. As can be seen from FIG. 10C, a corresponding part in FIG. 10A appears as a stylus part, and a corresponding part in FIG. 10B appears as a remaining virtual model part in the image to be finally displayed on the display device 201. That is, in the image to be finally displayed on the display device 201, the overlapping state of the stylus 302 and virtual model 402 is displayed (in an overlapping portion of the stylus model 403 and virtual model 402, the real image is seen through the virtual model 402 rendered as a translucent object, and in a non-overlapping portion of the stylus model 403 and virtual model 402, the real image (actually sensed image of the stylus) is directly seen).

In this way, the depth ordering, and the intersecting and overlapping states of the virtual object 402 and the stylus 302 as a real object operated by the user can be accurately and easily presented to the user.

If it is determined in step S2090 that the user executes an end process of the apparatus, the apparatus is to end. Ending the apparatus is a process to be finally executed so as to end the processing sequence of this embodiment by quitting the program, turning off the power supplies of devices that form the apparatus, and so forth. If the user does not execute any end process, the flow returns to step S2010.

As described above, according to the second embodiment as well, the position and orientation of a real object, which may have a state to be displayed without being occluded by a virtual object, are detected, and a model that represents this real object is used. Since a virtual space image is then rendered in accordance with the positional relationship between the virtual object and model determined on the virtual space, an MR image that can precisely express the depth ordering by a simple method and does not make the user feel unnatural can be generated.

Third Embodiment

An MR system using an image processing apparatus according to the third embodiment of the present invention will be described below. Since the MR system according to the third embodiment has the same system arrangement as that explained in the first embodiment using FIGS. 1 and 2, a description thereof will be omitted.

Figure 5:
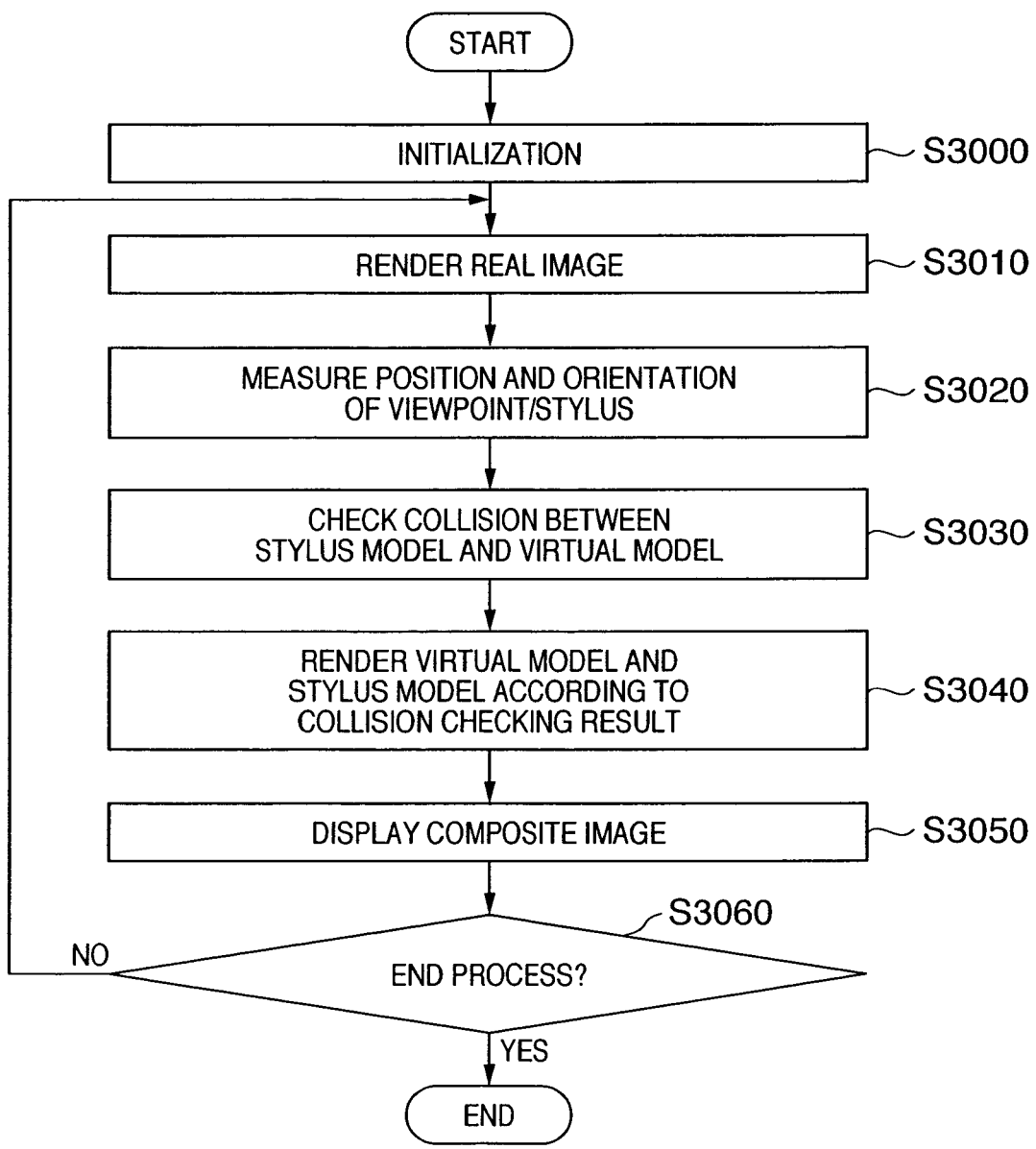
FIG. 5 is a flowchart for explaining an image processing sequence in the third embodiment of the present invention.

FIG. 5 is a flowchart for explaining the overall operation of the MR system according to this embodiment. Note that the program codes required to implement the processing to be described below are stored in a storage device such as the disk device 105, RAM 102, or the like, and are read out and executed by the CPU 101.

Since steps S3000 to S3020 in FIG. 5 are the same as steps S1000 to S1020 in FIG. 3, a description thereof will be omitted.

In step S3030, a collision checking process is executed on the basis of the positional relationship between the virtual model 402 (virtual object) and the stylus 302. However, as has been explained in the first embodiment, since the stylus 302 is a real object that exists on the real space, collision checking with the virtual model 402 that exists on the virtual space cannot be done. Hence, in this embodiment as well, a stylus model 403 which expresses a virtual object having the same shape (or a similar shape) as the stylus 302 is prepared in place of the stylus 302. The stylus model 403 is laid out on the virtual space in correspondence with the position and orientation of the stylus 302 measured in step S3020.

In order to lay out the stylus model 403 on the virtual space, the coordinate system of the real space must be perfectly matched with that of the virtual space. This process can be implemented by methods described in, e.g., Japanese Patent Laid-Open Nos. 2002-229730, 2003-269913, and the like. As a result, since the stylus model 403 and virtual model 402 are laid out on the identical virtual space, their collision checking can be done. The collision checking result obtained in step S3030 is stored in the disk device 105 or RAM 102. Note that the collision checking process between models is a state-of-the-art technique in CG, and a description thereof will be omitted in this specification.

In step S3040, the virtual model 402 and stylus model 403 are rendered on a memory such as the video buffer or the like using the collision checking result obtained in step S3030, the viewpoint position and orientation information and stylus position and orientation information measured in step S3020, and the position and orientation and color information of the virtual model 402 stored in the disk device 105 or RAM 102.

The process in step S3040 is executed according to FIGS. 11A to 11D on the basis of the collision checking result obtained in step S3030.

More specifically, if it is determined in step S3041 that collision between the virtual model 402 and stylus model 403 is detected, the flow advances to step S3042. In step S3042, as shown in FIG. 11B, the virtual model 402 is rendered as a translucent object (by changing the transparency as a rendering parameter), and the stylus model 403 is not rendered. (FIG. 11B shows a view region (HMD view region) corresponding to the image region to be displayed on the display device 201. (The HMD view region is formed by the video buffer.))

If it is determined in step S3041 that no collision between the virtual model 402 and stylus model 403 is detected, the flow advances to step S3043. In step S3043, as shown in FIG. 11C or 11D, the virtual model 402 is rendered as a normal opaque object, and the stylus model 403 is rendered as a transparent object (i.e., using predetermined color buffer values (e.g., (R, G, B)=(0, 0, 0)) to allow a real image as a background image to be seen through while updating Z-buffer values). Note that FIG. 11C depicts a case wherein the stylus model 403 is located in front of the virtual model 402 when viewed from the user's viewpoint position. Conversely, FIG. 11D depicts a case wherein the stylus model 403 is located behind the virtual model 402 when viewed from the user's viewpoint position. (FIGS. 11C and 11D show a view region (HMD view region) corresponding to the image region to be displayed on the display device 201. (The HMD view region is formed by the video buffer.)

Note that FIGS. 11B to 11D plainly indicate the rendering position of the stylus model 403 by illustrating it using the dotted line. However, this dotted line is not rendered on the video buffer in practice. Also, the background transparency is set to be 100% so as to allow the background to be seen through in a region other than the virtual model 402 and stylus model 403.

In step S3050, the virtual model 402 and stylus model 403 rendered in step S3040 are superimposed on and composited onto the real image rendered in step S3010, and a composite image is displayed on the display device 201 via the image output device 103. FIGS. 12A to 12C show a composited and displayed image. FIG. 12A shows an image obtained by compositing the video buffer shown in FIG. 11B and the real image. When the virtual model 402 and stylus model 403 collide against each other, the virtual model 402 is translucently displayed, as shown in FIG. 12A. In this manner, the colliding part of the stylus is seen through the virtual object, and a situation in which the virtual model 402 and stylus 302 intersect with each other can be presented.

FIG. 12B shows an image obtained by compositing the video buffer shown in FIG. 11C and the real image. When the virtual model 402 and stylus model 403 do not collide against each other, and the stylus model 403 is located in front of the virtual model 402 when viewed from the user's viewpoint position, the stylus 302 can be presented to be located in front of the virtual model 402 when viewed from the user's viewpoint position, as shown in FIG. 12B. FIG. 12C shows an image obtained by compositing the video buffer shown in FIG. 11D and the real image. When the virtual model 402 and stylus model 403 do not collide against each other, and the stylus model 403 is located behind the virtual model 402 when viewed from the user's viewpoint position, the stylus 302 can be presented to be located behind the virtual model 402 when viewed from the user's viewpoint position, as shown in FIG. 12C.

As a modification of step S3042, when the virtual model 402 and stylus model 403 collide against each other, their positional relationship may be compared, and the transparency (a so-called a value in the CG technique) of the virtual model 402 may be controlled to lower as the stylus model 403 viewed from the user's viewpoint position moves to the back side with respect to the virtual model 402.

In this way, the depth ordering, and the intersecting and overlapping states of the virtual model 402 and the stylus 302 as a moving real object can be accurately and easily presented to the user.

If it is determined in step S3060 that the user executes an end process of the apparatus, the apparatus is to end. Ending the apparatus is a process to be finally executed so as to end the processing sequence of this embodiment by quitting the program, turning off the power supplies of devices that form the apparatus, and so forth. If the user does not execute any end process, the flow returns to step S3010.

In step S3030 of this embodiment, at the instance of detection of collision between the stylus model 403 and virtual model 402, effect sound that expresses collision may be output. Alternatively, the stylus 302 may have a vibration element, and at the instance of detection of collision between the stylus model 403 and virtual model 402 in step S3030, the stylus 302 may be vibrated for a prescribed period of time to inform the user of collision.

In step S3042 of this embodiment, some of all polygon surfaces of the virtual model 402 may be translucently displayed as long as the intersecting and overlapping states of the stylus model 403 can be presented.

As described above, according to the third embodiment as well, the position and orientation of a real object, which may have a state to be displayed without being occluded by a virtual object, are detected, and a model that represents this real object is used. Since a virtual space image is then rendered in accordance with the positional relationship between the virtual object and model determined on the virtual space, an MR image that can precisely express the depth ordering by a simple method and does not make the user feel unnatural can be generated.

Fourth Embodiment

An MR system using an image processing apparatus according to the fourth embodiment of the present invention will be described below. Since the MR system according to the fourth embodiment has the same system arrangement as that explained in the first embodiment using FIGS. 1 and 2, a description thereof will be omitted.

Figure 6:
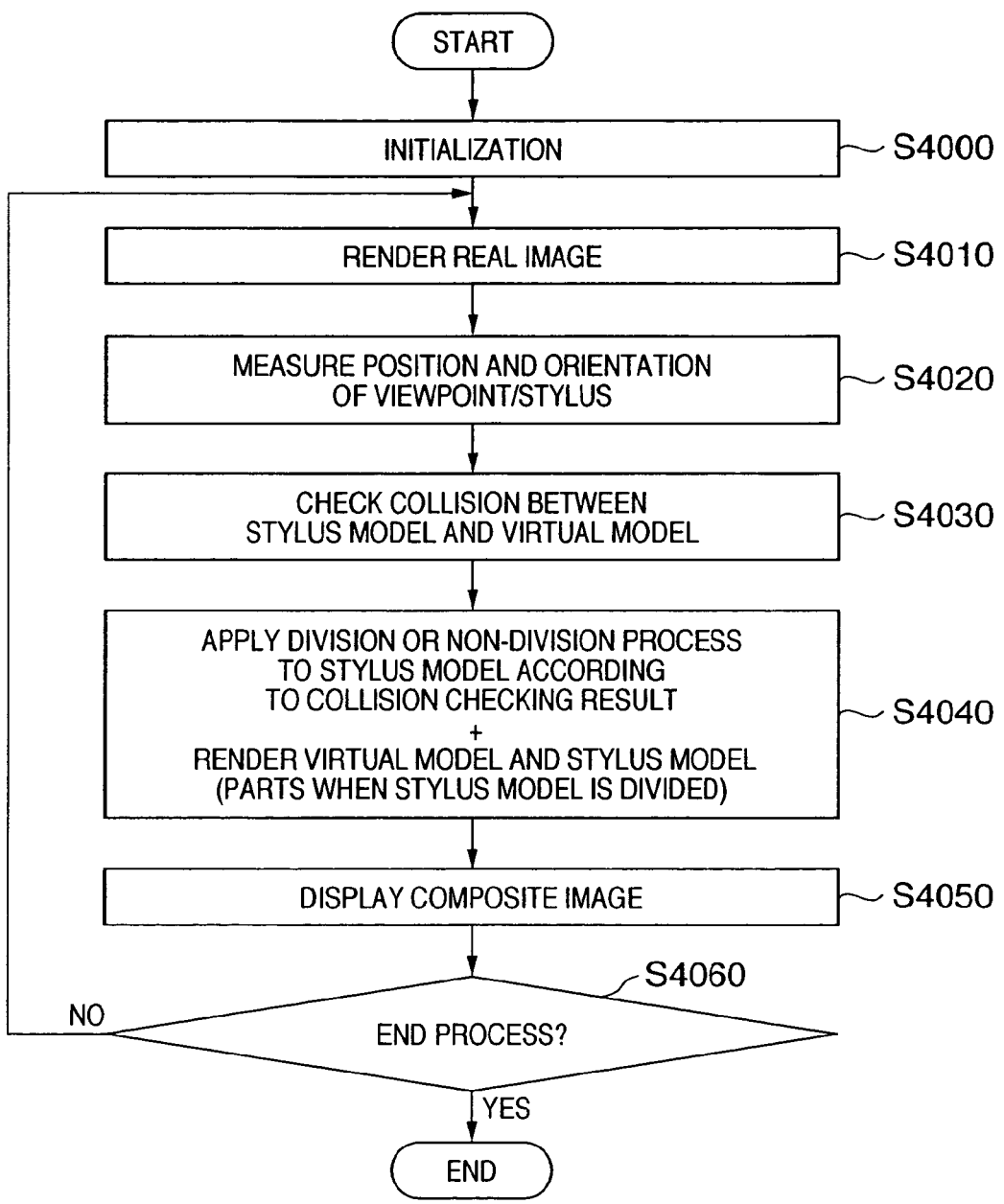
FIG. 6 is a flowchart for explaining an image processing sequence in the fourth embodiment of the present invention.

FIG. 6 is a flowchart for explaining the overall operation of the MR system according to this embodiment. Note that the program codes required to implement the processing to be described below are stored in a storage device such as the disk device 105, RAM 102, or the like, and are read out and executed by the CPU 101.

Since steps S4000 to S4030 in FIG. 6 are the same as steps S3000 to S3030 in FIG. 5, a description thereof will be omitted.

In step S4040, a division or non-division process is applied to the stylus model 403 in accordance with the collision checking result obtained in step S4030. The virtual model 402 and stylus model 403 (respective parts if the stylus model 403 is divided) are rendered on a memory such as the video buffer or the like using the viewpoint position and orientation information and stylus position and orientation information measured in step S4020, the position and orientation and color information of the virtual model 402 stored in the disk device 105 or RAM 102, and color information of stylus model parts stored in the disk device 105 or RAM 102.

Figure 13A:
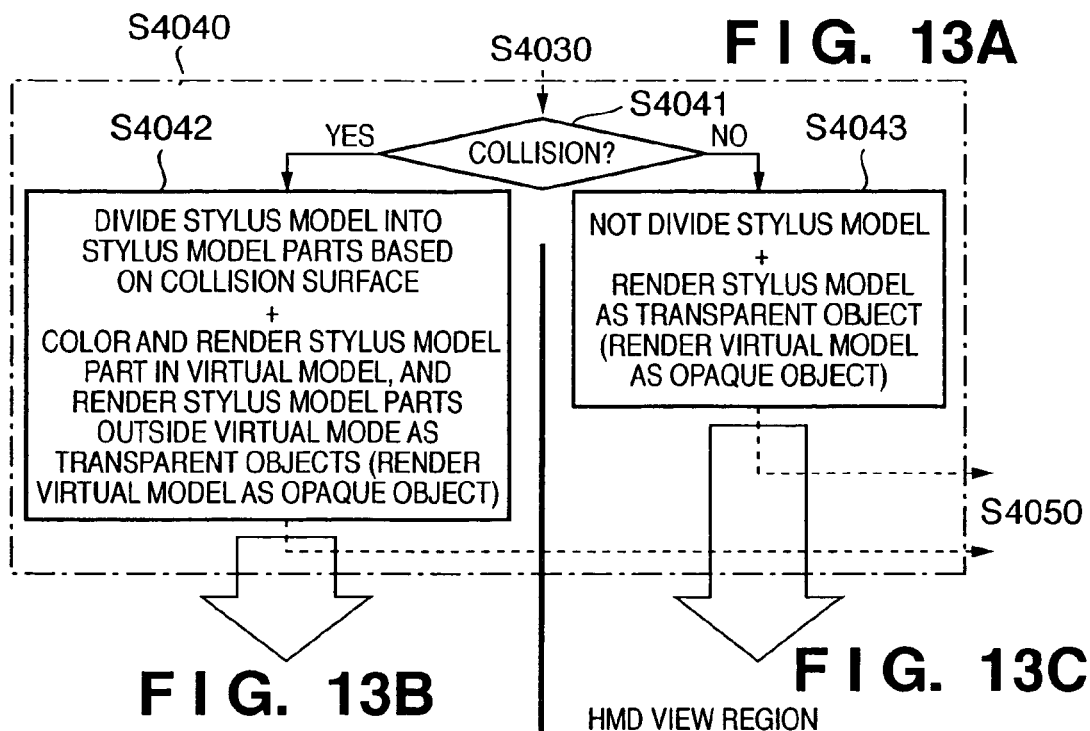
FIGS. 13A to 13D are views for explaining a rendering process of a virtual model and stylus model in the fourth embodiment of the present invention.

The process in step S4040 is executed according to FIGS. 13A to 13D on the basis of the collision checking result obtained in step S4030. More specifically, if it is determined in step S4041 that collision between the virtual model 402 and stylus model 403 is detected, the flow advances to step S4042. In step S4042, as shown in FIG. 13A, the stylus model is divided into stylus model parts (P1 to P3) based on collision surface (intersection surface). These parts P1 to P3 respectively correspond to regions B, C-1, and C-2 in the first embodiment.

Figure 13B:
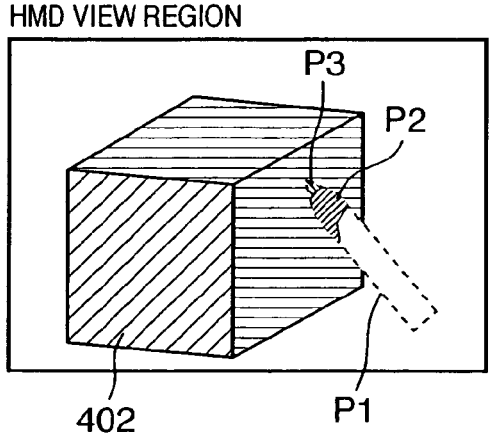

Next, the stylus model part (P2) in the virtual model 402 is colored and rendered, and the stylus model parts (P1, P3) outside the virtual model 402 are rendered as transparent objects (i.e., using predetermined color buffer values (e.g., (R, G, B)=(0, 0, 0)) to allow a real image as a background image to be seen through while updating Z-buffer values). P2 is rendered to be located in front of the virtual object while ignoring its depth information, and rendering parameters are changed so that its existence becomes conspicuous. For example, P2 may be rendered using a predetermined color, as a translucent object, using a mesh pattern, as a wire frame, or to flicker. The virtual model 402 itself is rendered as a normal opaque object. (FIG. 13B shows a view region (HMD view region) corresponding to the image region to be displayed on the display device 201. (The HMD view region is formed by the video buffer.))

Figure 13C:
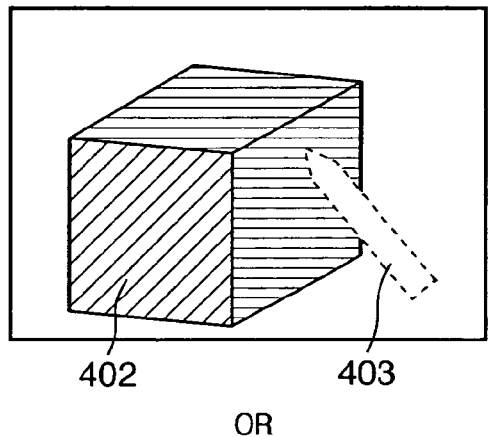
Figure 13D:
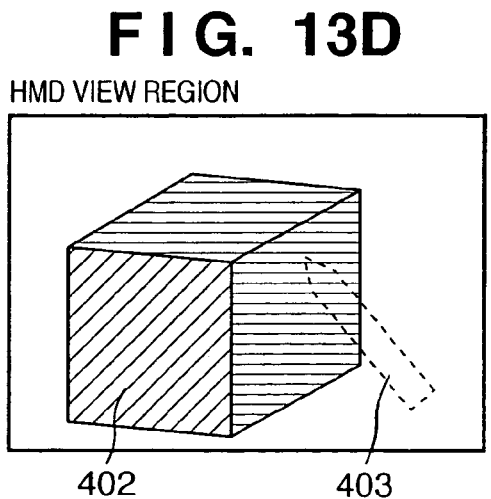

If it is determined in step S4041 that no collision between the virtual model 402 and stylus model 403 is detected, the flow advances to step S4043. In step S4043, the stylus model 403 is not divided, the virtual model 402 is rendered as a normal opaque object, and the stylus model 403 is rendered as a transparent object (i.e., using predetermined color buffer values (e.g., (R, G, B)=(0, 0, 0)) to allow a real image as a background image to be seen through while updating Z-buffer values), as shown in FIG. 13C or 13D. Note that FIG. 13C depicts a case wherein the stylus model 403 is located in front of the virtual model 402 when viewed from the user's viewpoint position. Conversely, FIG. 13D depicts a case wherein the stylus model 403 is located behind the virtual model 402 when viewed from the user's viewpoint position. (FIGS. 13C and 13D show a view region (HMD view region) corresponding to the image region to be displayed on the display device 201. (The HMD view region is formed by the video buffer.)

Note that FIGS. 13B to 13D plainly indicate the rendering position of the stylus model 403 (stylus model parts P1 to P3 when the stylus model 403 is divided) by illustrating it using the dotted line. However, this dotted line is not rendered on the video buffer in practice. Also, the background transparency is set to be 100% so as to allow the background to be seen through in a region other than the virtual model 402 and stylus model 403 (stylus model parts P1 to P3 when the stylus model 403 is divided).

In step S4050, the virtual model 402 and stylus model 403 (stylus model parts P1 to P3 when the stylus model 403 is divided) rendered in step S4040 are superimposed on and composited onto the real image rendered in step S4010, and a composite image is displayed on the display device 201 via the image output device 103. FIGS. 14A to 14C show a composited and displayed image. FIG. 14A shows an image obtained by compositing the video buffer shown in FIG. 13B and the real image. When the virtual model 402 and stylus model 403 collide against each other, the color of the intersecting part of the stylus model 403 and virtual model 402 changes, as shown in FIG. 14A. In this manner, an intersecting situation of the virtual model 402 and stylus 302 can be presented. As a modification of FIG. 14A, FIG. 14B is possible. In FIG. 14B, contour lines of the stylus model parts P1 to P3 are re-rendered to be located on the front most position while ignoring their depth information. In this way, the position of the stylus model part P1 located behind the virtual model 402 when viewed from the user's viewpoint position can be indicated.

FIG. 14C shows an image obtained by compositing the video buffer shown in FIG. 13C and the real image. When the virtual model 402 and stylus model 403 do not collide against each other, and the stylus model 403 is located in front of the virtual model 402 when viewed from the user's viewpoint position, the stylus 302 can be presented to be located in front of the virtual model 402 when viewed from the user's viewpoint position, as shown in FIG. 14C. FIG. 14D shows an image obtained by compositing the video buffer shown in FIG. 13D and the real image. When the virtual model 402 and stylus model 403 do not collide against each other, and the stylus model 403 is located behind the virtual model 402 when viewed from the user's viewpoint position, the stylus 302 can be presented to be located behind the virtual model 402 when viewed from the user's viewpoint position, as shown in FIG. 14D.

In this way, the depth ordering, and the intersecting and overlapping states of the virtual object 402 and the stylus 302 as a moving real object can be accurately and easily presented to the user.

If it is determined in step S4060 that the user executes an end process of the apparatus, the apparatus is to end. Ending the apparatus is a process to be finally executed so as to end the processing sequence of this embodiment by quitting the program, turning off the power supplies of devices that form the apparatus, and so forth. If the user does not execute any end process, the flow returns to step S4010.

In step S4030 of this embodiment, at the instance of detection of collision between the stylus model 403 and virtual model 402, effect sound that expresses collision may be output as in the third embodiment. Alternatively, the stylus 302 may have a vibration element, and at the instance of detection of collision between the stylus model 403 and virtual model 402 in step S4030, the stylus 302 may be vibrated for a prescribed period of time to inform the user of collision.

As described above, according to the fourth embodiment as well, the position and orientation of a real object, which may have a state to be displayed without being occluded by a virtual object, are detected, and a model that represents this real object is used. Since a virtual space image is then rendered in accordance with the positional relationship between the virtual object and model determined on the virtual space, an MR image that can precisely express the depth ordering by a simple method and does not make the user feel unnatural can be generated.

Other Embodiment

In the processes of the above embodiments, the processes have been explained as independent steps (e.g., the process for compositing with the real image is done after the process for rendering the virtual model and stylus model). However, the virtual model and stylus model can be rendered while being composited onto the real image.

The processes of the above embodiments include descriptions "rendered at the background transparency of 100%". Alternatively, predetermined color buffer values (e.g., (R, G, B)=(0, 0, 0)) may be input to allow a real image as a background image to be seen through.

The above embodiments have exemplified the apparatus using the magnetic sensor as means for measuring the position and orientation. However, the gist of the present invention is not limited to such specific means. For example, the means for measuring the position and orientation can be implemented by other means such as an optical position/orientation measuring device, mechanical position/orientation measuring device, measuring instrument, and the like.

In step S1040 of the first embodiment, step S2030 of the second embodiment, step S3042 of the third embodiment, and the like, translucent rendering is done. Alternatively, the object may be rendered by mesh expression using a mesh pattern or by wire frame expression. In short, the rendering parameters other than the background transparency can be changed for respective divided regions as long as a display pattern that can visually recognize the depth ordering between the virtual object and the device (stylus) operated in user's hand is adopted.

In the first embodiment, the a value upon decreasing the background transparency is fixed. Alternatively, the $\alpha$ value may be changed in accordance with n, or the background transparency may be set to be $(100-\beta)$% and the $\beta$ value may be set in advance in accordance with n.

In this embodiment, the stylus which is operated in user's hand has been exemplified as a real object to be displayed without being occluded by the virtual object. However, such real object may be other real objects, or it need not be a device operated by the user. The aforementioned method can be applied to at least an arbitrary real object whose position and orientation can be detected.

Also, as for building components shown in respective figures, the building components with the same reference numerals implement the same functions.

In the above embodiments, the present invention is applied to the MR system having the sensor, display device, and the like. However, the system need not comprise the sensor and display device themselves as long as the position and orientation of the user's viewpoint position and those of the stylus can be obtained. That is, the arrangement including only the arithmetic processor 100 is available.

Note that the objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

As many apparently widely different embodiments of the present invention can be made without departing from the spirit and scope thereof, it is to be understood that the invention is not limited to the specific embodiments thereof except as defined in the appended claims.

What is claimed is:

1. An image processing method for generating a mixed reality image by compositing an image of a virtual object having position and orientation information to a real space image and displaying the mixed reality image on an image plane of a display unit, comprising the steps of:
    acquiring, by a microprocessor, viewpoint position and orientation information of a user;
    detecting, by the microprocessor, position and orientation information of a predetermined real object;
    detecting, by the microprocessor, a positional relationship between the virtual object and the predetermined real object;
    generating, by the microprocessor, a first image by rendering the virtual object as a translucent object and the predetermined real object according to the positional relationship;
    generating, by the microprocessor, a second image by superimposing the first image on the real space image on the basis of the viewpoint position and orientation information;
    generating, by the microprocessor, a third image by rendering the predetermined real object as a transparent object which is positioned in front of the virtual object and is not intersecting with the virtual object and rendering the virtual object as an opaque object according to the positional relationship; and
    generating, by the microprocessor, the mixed reality image by superimposing the third image on the second image;
    wherein in the step of generating the first image, if the predetermined real object intersects with the virtual object, the microprocessor renders the intersecting part of the predetermined real object as the virtual object.

2. The method according to claim 1, wherein the predetermined real object is operated by the user.

3. An image processing apparatus for generating a mixed reality image by compositing an image of a virtual object having position and orientation information to a real space image and displaying the mixed reality image on an image plane of a display unit, comprising:
    a user position and orientation information acquisition unit adapted to acquire viewpoint position and orientation information of a user;
    a real object position and orientation information acquisition unit adapted to detect position and orientation information of a predetermined real object;
    a positional relationship acquisition unit adapted to detect a positional relationship between the virtual object and the predetermined real object; and
    a microprocessor adapted, (i) to generate a first image by rendering the the virtual object as a translucent object and the predetermined real object according to the positional relationship, (ii) to generate a second image by superimposing the first image on the real space image on the basis of the viewpoint position and orientation information, (iii) to generate a third image by rendering the predetermined real object as a transparent object which is positioned in front of the virtual object and is not intersecting with the virtual object and rendering the virtual object as an opaque object according to the positional relationship, and (iv) to generate the mixed reality image by superimposing the third image on the second image;
    wherein, when generating the first image, if the predetermined real object intersects with the virtual object, the microprocessor renders the intersecting part of the predetermined real object as the virtual object.

4. A computer storage medium containing instructions that implements the image processing method of claim 1.

* * * * *